United States Patent
Cartensen

[11] Patent Number: 5,852,949
[45] Date of Patent: *Dec. 29, 1998

[54] SEGMENTED SCREW TRAVERSING MECHANISM

[75] Inventor: Peter T Cartensen, Adirondack, N.Y.

[73] Assignee: Thermo Fibertek Inc., Waltham, Mass.

[*] Notice: This patent issued on a continued prosecution application filed under 37 CFR 1.53(d), and is subject to the twenty year patent term provisions of 35 U.S.C. 154(a)(2).

[21] Appl. No.: 688,499

[22] Filed: Jul. 30, 1996

[51] Int. Cl.⁶ .................................................. F16H 25/24
[52] U.S. Cl. .................................. 74/424.8 A; 74/89.15; 403/340; 403/362; 411/437
[58] Field of Search ........................... 74/424.8 A, 89.15; 403/339, 341, 340, 362; 411/437, 539; 464/179, 182

[56] References Cited

U.S. PATENT DOCUMENTS

| | | | |
|---|---|---|---|
| 594,043 | 11/1897 | Thompson et al. | 403/339 |
| 617,536 | 1/1899 | Martin | 403/339 X |
| 1,535,293 | 4/1925 | Collins | 403/340 |
| 2,582,873 | 1/1952 | Larson et al. | 403/339 X |
| 3,298,197 | 1/1967 | Roth | 464/182 |
| 3,670,583 | 6/1972 | Leming . | |
| 3,936,001 | 2/1976 | Clendaniel . | |
| 4,352,585 | 10/1982 | Spalding | 403/341 X |
| 4,540,469 | 9/1985 | Lundstrom . | |
| 4,598,238 | 7/1986 | Scarano . | |
| 4,646,831 | 3/1987 | Marsh et al. | 403/340 X |
| 4,701,242 | 10/1987 | Scarano et al. . | |
| 4,848,174 | 7/1989 | Brown et al. | 74/424.8 A X |
| 5,012,687 | 5/1991 | Hoshide | 74/89.15 |
| 5,085,094 | 2/1992 | Clawson et al. . | |
| 5,129,601 | 7/1992 | Henkel | 74/424.8 A X |
| 5,143,477 | 9/1992 | Kanehira et al. | 403/341 |

FOREIGN PATENT DOCUMENTS

| | | | |
|---|---|---|---|
| 1145864 | 3/1963 | Germany | 464/182 |

Primary Examiner—Richard M. Lorence
Assistant Examiner—Scott Lund
Attorney, Agent, or Firm—Kane, Dalsimer, Sullivan, Kurucz, Levy, Eisele and Richard, LLP

[57] ABSTRACT

The linear traversing apparatus includes a lead screw formed from a plurality of lead screw segments which are supported at regular intervals, that is, at the intersection of adjacent lead screw segments, along a span by fixed hollow cylindrical splice points. The lead screw segments include external threading which engages the internal threading of a C-shaped spanning nut. The C-shaped spanning nut has a circumferential portion removed so that the spanning nut can clear the fixed hollow cylindrical splice points and associated support structure as the spanning nut traverses the lead screw in response to the rotation of the lead screw and the inhibition of rotation of the spanning nut. The rotation of the spanning nut is inhibited typically by mechanical communication with an instrument or other device which is engaged by a rail or slot parallel to the longitudinal axis of rotation of the lead screw.

6 Claims, 5 Drawing Sheets

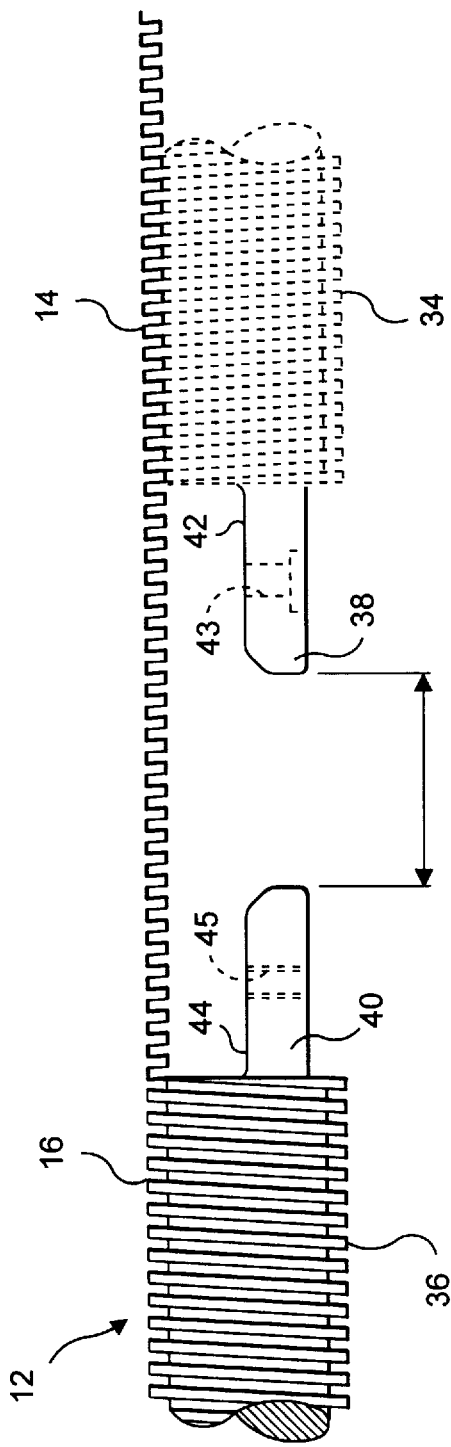
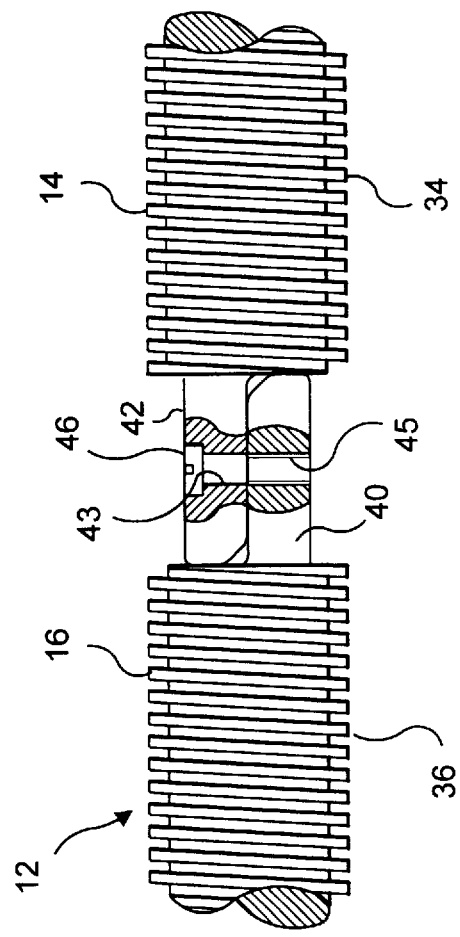

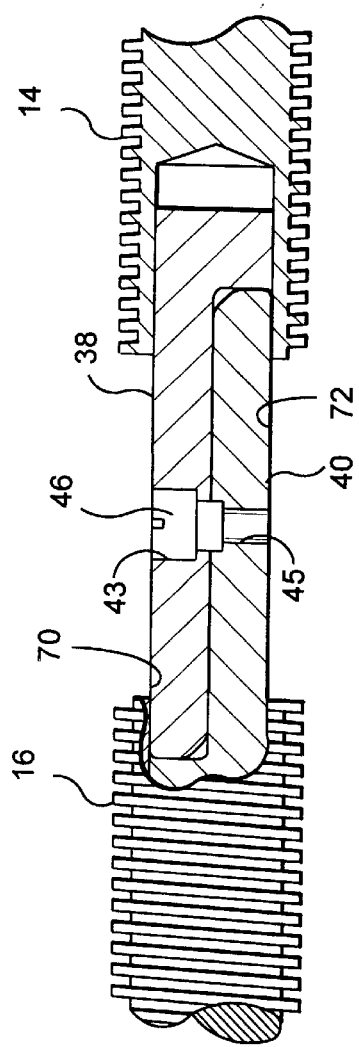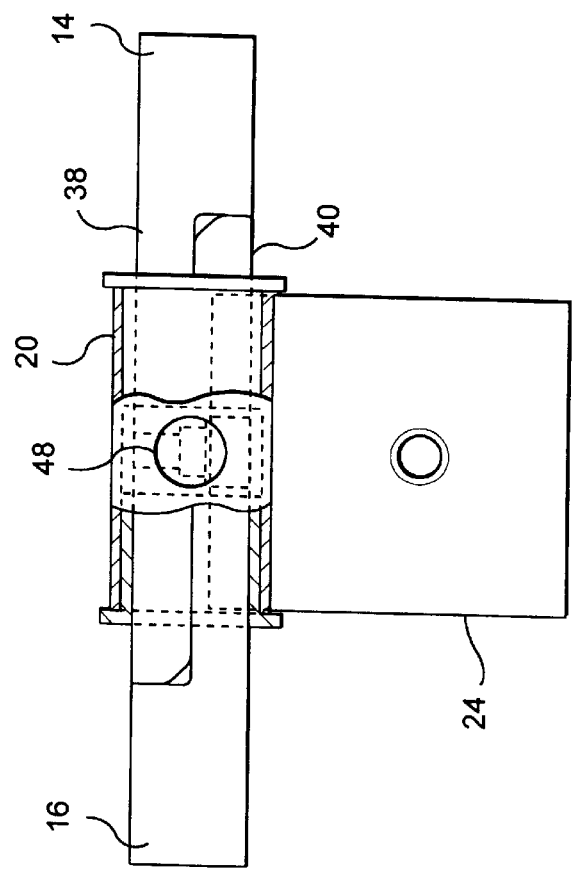
FIG. 5A
FIG. 5B

SEGMENTED SCREW TRAVERSING MECHANISM

BACKGROUND OF THE INVENTION

1. Field of the Invention

The present invention relates to a screw traversing mechanism which may be utilized in carrying a shower, sensor or other device across a span, which is particularly useful in papermaking.

2. Description of the Prior Art

In the papermaking art for example showers are used to rewet the paper web or to clean and condition the fabric or wire after the sheet has passed therefrom or to clean rolls or moulds during their operation. Such showers typically span the cross machine direction of the machine above the fabric or rolls to accomplish this purpose.

A device of this nature is disclosed in U.S. Pat. No. 4,701,242 issued Oct. 20, 1987. This device involves the use of a shower head mechanism which is supported by a housing having a track and trolley which spans the web. A shower is positioned on the trolley with its movement and position regulated.

Other mechanisms for moving a shower or showers across a web involves the use oscillating ball and screw arrangements through which the shower is supported and its movement regulated. An example of this is found in U.S. Pat. No. 4,598,238 issued Jul. 1, 1986.

While these devices provide satisfactorily it is desirable to provide a more simplified mechanism to support and move the shower. This is especially true in situations where the shower traverses a long span.

Also it is desirable to have such a device which allows for spot forming activity to the web as desired.

OBJECTIVES AND SUMMARY OF THE INVENTION

It is therefore a principal object of the invention to provide for a screw traversing mechanism which is relatively simple and reliable.

It is a further object to provide for such a mechanism which will support and control the motion of a shower across a fabric, wire or web used in papermaking.

It is a yet further object to provide for such a mechanism which has a multitude of applications for supporting desired devices across spans including extended spans, typically involved in papermaking.

According to this invention, a segmented screw assembly is provided to provide a simple yet effective means to allow the spanning of a distance across paper machine elements and the like. In this regard, the screw comprises a series of segments, coupled together. The segments are supported by support members, positioned about its length. The supports do not interfere with the rotation of the screw segments. A "C" shaped spanning nut is; positioned on the screw and travels axially along the screw upon its rotation. The spanning web is so configured that it freely travels across the segments and support members. As such the spanning nut can be mounted with a shower or other device and effectually transverse the length of the span.

BRIEF DESCRIPTION OF THE DRAWINGS

Thus by the present invention its objects and advantages will be realized, the description of which should be taken in conjunction,with the drawings where:

FIGS. 2A and 2B illustrate the thread matching of successive segments and the coupling these between;

FIGS. 5A and 5B are plan views, partially in perspective, of the details of the joining of the segment screws of the embodiment of FIG. 4.

DETAILED DESCRIPTION OF THE PREFERRED EMBODIMENT

Figure 1:
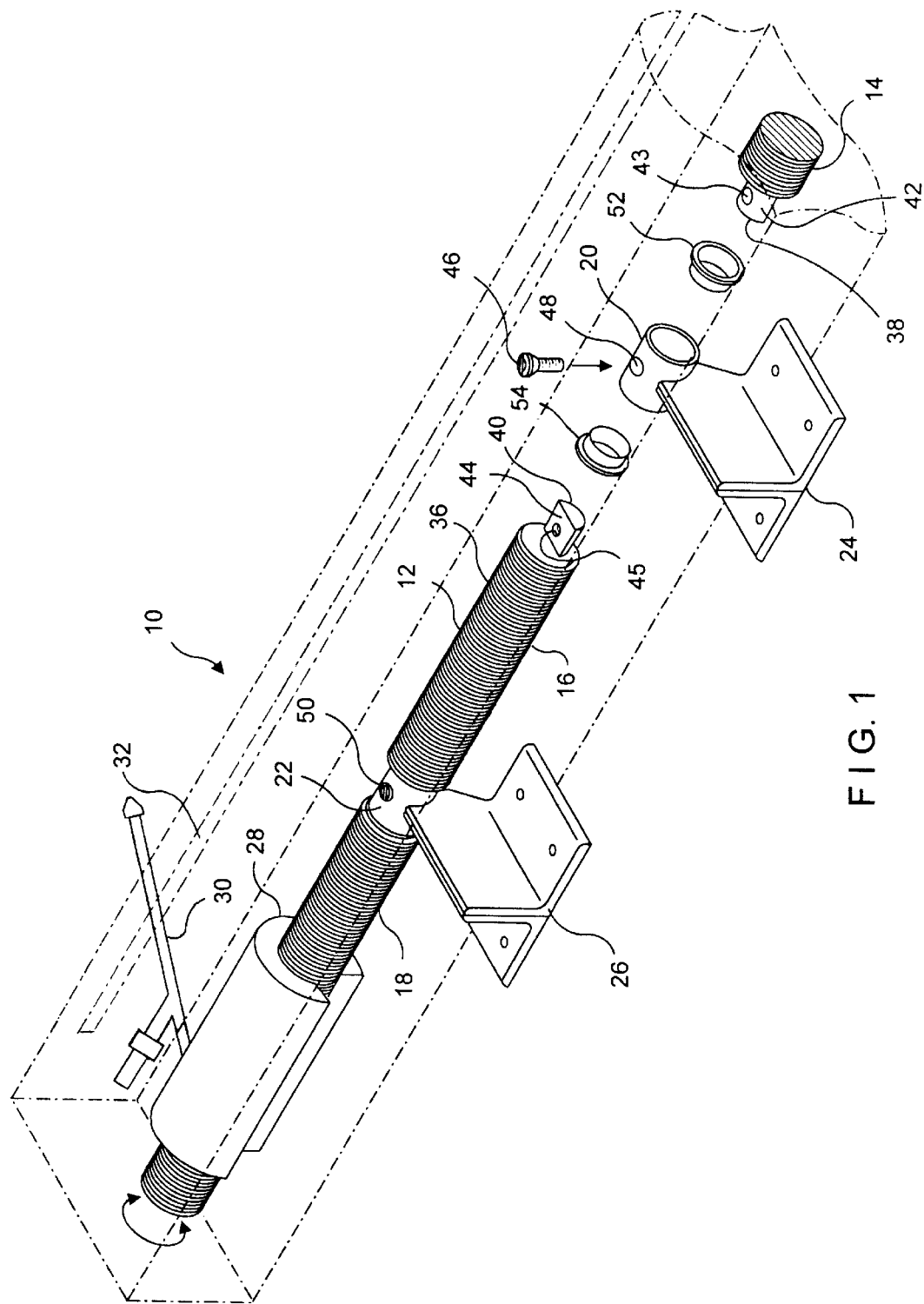
FIG. 1 is a perspective partially exploded view of segmented Screw Traversing mechanism having a housing and shower shown in phantom.
Figure 4:
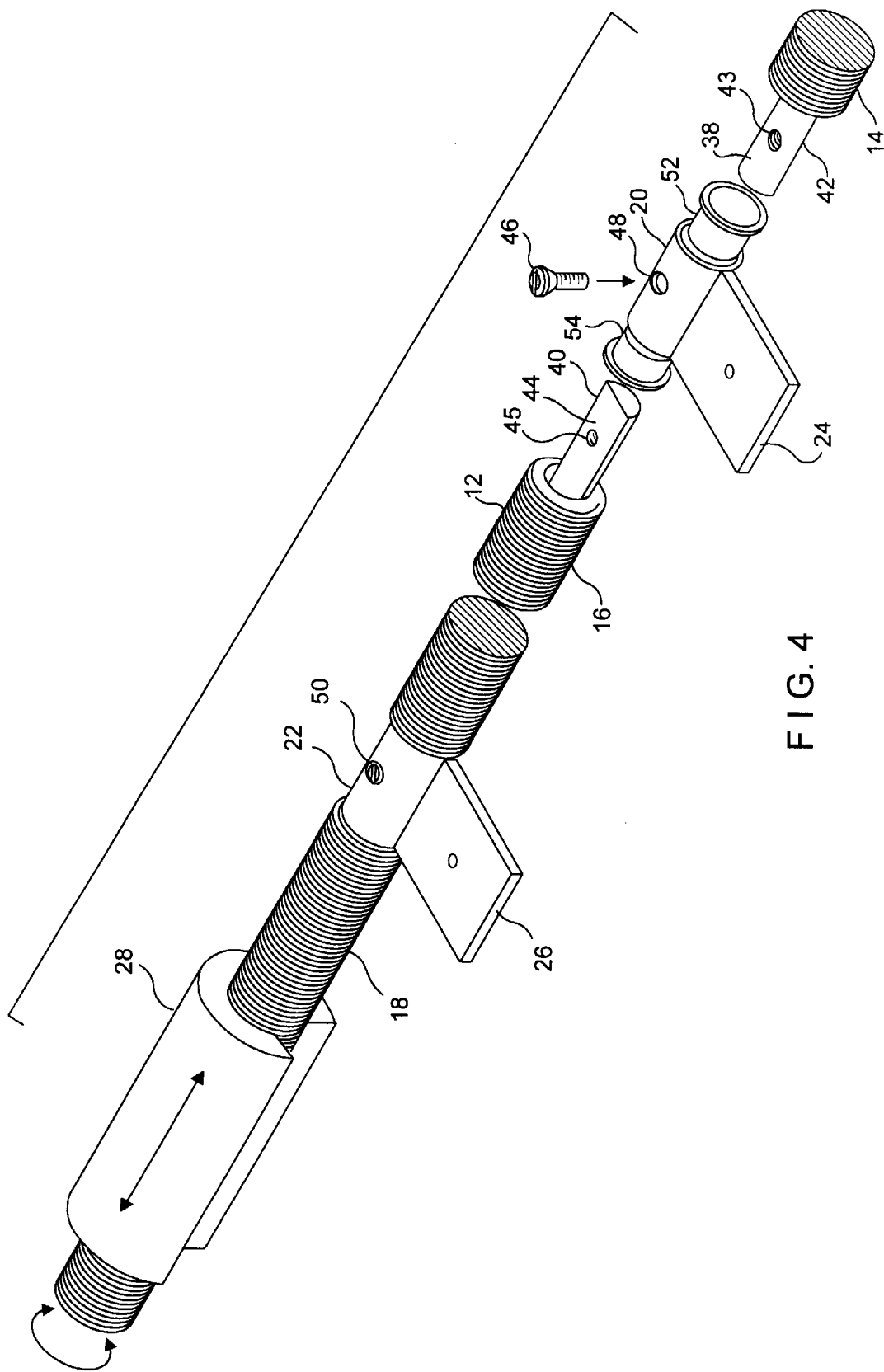
FIG. 4 is a front perspective view of an alternative embodiment of the present invention for more robust torque transmission.

Referring now to the drawings in detail wherein like numerals refer to like elements throughout the several views, one sees that FIGS. 1 and 4 are partially exploded perspective views of the screw traversing mechanism 10 of the present: invention.

Screw traversing mechanism 10 includes a segmented externally threaded lead screw 12 which is comprised of lead screw segments 14, 16, 18. While three lead screw segments 14, 16, 18 are illustrated, the segmented externally threaded lead screw 12 can be extended indefinitely with successive lead screw segments. Segmented externally threaded lead screw 12 is journaled for rotation within fixed hollow cylindrical splice points 20, 22 which are, in turn, affixed to and supported by blocks 24, 26. Spanning nut 28 is a hollow internally threaded partial cylinder with a portion of its circumference removed thereby forming a "C" type cross section. Spanning nut 28 is further affixed, for example, to a shower head 30 (or similar apparatus) which is, in turn, engaged by slot 32 formed parallel to the longitudinal or rotational axis of segmented externally threaded lead screw 12. The internal threading of spanning nut 28 engages the external threading of segmented externally threaded lead screw 12. As the engagement of shower head 30 into slot 32 inhibits rotation of spanning nut 28, the rotation of segmented externally threaded lead screw 12 will cause spanning nut 28 to axially traverse segmented externally threaded lead screw 12. Other means for preventing the rotational movement of spanning nut 28 to allow axial movement thereof along the lead. screw 12 and whatever device is coupled therewith which movement. is being regulated will be readily apparent to those skilled in the art. For example, a trolley supporting a shower and located on a track with the spanning nut 28 being coupled to the trolley is a possibility. Flexible tubing or other connections necessary can be coupled to the shower or other device to provide water, air or any other medium required.

The "C" type cross section of spanning nut 28 allows the spanning nut 28, during the traversal of externally threaded lead screw 12, to clear blocks 24, 26 which support fixed hollow cylindrical splice points 20, 22.

As shown in more detail in FIGS. 2A and 2B, lead screw segments 14, 16 (and likewise 18 and any successive lead screw segments) include externally threaded cylindrical portions 34, 36, respectively. Lead screw segments 14, 16 further include axially extending semi-cylindrical flanges 38, 40, respectively, with a central axis coincident with the rotational axis of lead screw segments 14, 16. Semi-cylindrical flanges 38, 40 further include inwardly facing planar faces 42, 44 (see also FIG. 1) through which the rotational axis of lead screw segments 14, 16 passes. This allows the inwardly facing planar faces 42, 44 of semi-cylindrical flanges 38, 40 of adjacent lead screw segments 14, 16 to engage each other as shown in FIG. 2B. As shown in FIGS. 1, 2A and 2B, cylindrical flanges 38, 40 further include radially oriented internally threaded apertures 43, 45 (aperture 43 being countersunk) which allow bolt 46 to fasten flanges 38, 40 together. As can be seen from FIG. 1, bolt 46 can be installed by passing it through apertures 48, 50 in fixed hollow cylindrical splice points 20, 22 and threading it down to secure the coupling of the lead screw segments 14, 16. This configuration allows the rotation of a single threaded screw segment from an external rotational motion source, such as a motor (see element 60 in FIG. 3), to be mechanically communicated to a plurality of sequential threaded screw segments which form the segmented externally threaded lead screw 12. Extremely long segmented externally threaded lead screws can be formed without significant sagging as the lead screw 12 is supported by fixed hollow cylindrical splice points 20, 22 at regular intervals. The axial length of semi-cylindrical flanges 38, 40, along with the orientation of the threads of externally threaded cylindrical portions 34, 36 are spaced such that, in the configuration shown in FIG. 2B, the threads of external cylindrical portion 34 are "in phase" with the threads of external cylindrical portion 36 so that a continuous thread pitch between adjacent lead screw segments is achieved. That is, the distance measured axially between respective portions of threads of adjacent lead screw segments is equal to an integer multiple of the distance between respective portions of successive threads on a single lead screw segment. This allows for the smooth axial travel of spanning nut 28 with little or no stripping of the threads as the spanning nut 28 traverses between adjacent lead screw segments in response to the rotation of lead screw segments 14, 16, 18 of segmented externally threaded lead screw 12.

As shown in FIG. 1, semi-cylindrical flanges 38, 40 engage washer-type sleeves 52, 54 within fixed hollow cylindrical splice points (illustrated at 20 only) to facilitate the rotation of the lead screw segments 14, 16, 18 which comprise segmented externally threaded lead screw 12.

Figure 3:
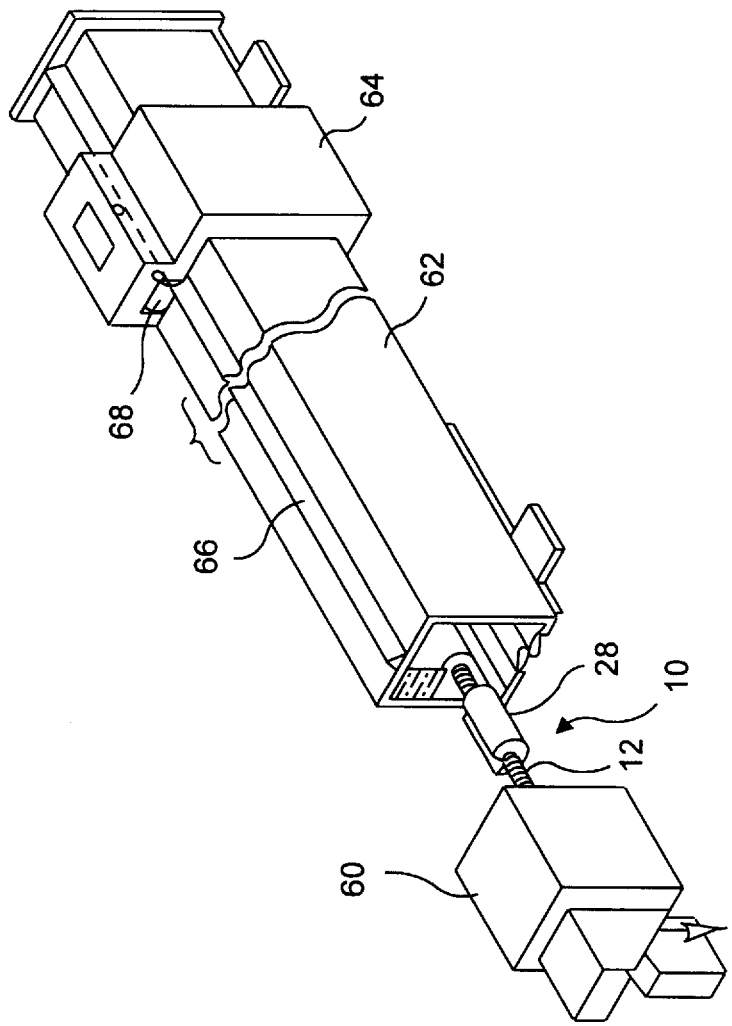
FIG. 3 is a perspective view of a box beam which encloses a series of segment screws which is used to move a scanning instrument.

FIG. 3 is an illustration of screw traversing mechanism 10 of the present invention with an end of externally threaded lead screw 12 engaged by external rotational motion source 60 and the spanning nut 28 traveling through a beam box enclosure 62. Instrument 64 is mounted on casters 68 which engage the axial rail 66 of beam box enclosure 62. The movement of spanning nut 28 in response to the rotation of externally threaded lead screw 12 mechanically drives the instrument 64 such as a sensor which traverses the exterior of beam box enclosure 62. The open circumferential portion of spanning nut 28 is oriented upwardly so as to accommodate the mechanical support structure for externally threaded lead screw 12 (similar to fixed hollow cylindrical splice points 20, 22 and blocks 24, 26 of FIGS. 1, 2A and 2B).

To use the screw traversing mechanism 10 of the present invention, blocks 24, 26 with fixed hollow cylindrical splice points 20, 22 are affixed at the appropriate intervals across a span, such as above a paper web. Lead screw segments 14, 16, 18, along with washer-type sleeves 52, 54 are installed within fixed hollow cylindrical splice points 20, 22 and are fastened together by bolts 46 which pass through apertures 48, 50 and are secured within apertures 43, 45 so as to engage inwardly facing planar faces 42, 44 of semi-cylindrical flanges 38, 40 of adjacent lead screw segments. The internal threads of spanning nut 28 is engaged to the external threads of one of lead screw segments 14, 16, 18 when an end of one of the lead screw segments is free, either before or after the lead screw segments are joined together. The spanning nut 28 is affixed to a shower head 30 which engages a slot 32 as shown in FIG. 1, or an attachment as shown in FIG. 3 where the spanning nut 28 is affixed to the instrument or sensor 64 by way of a drop leg or link through the enclosure 62 which precludes rotation of the spanning nut 28 while allowing it to provide axial movement to the instrument or sensor 64 as lead screw 12 rotates. It is important that the spanning nut 28 be inhibited from rotating in unison with the externally threaded lead screw 12 and that the spanning nut 28 be oriented so that its open circumferential portion will clear the fixed hollow cylindrical splice points 20, 22 and blocks 24, 26 as the spanning nut 28 axially traverses the externally threaded lead screw 12. The externally threaded lead screw 12 is attached to an external rotational motion source, such as 60 in FIG. 3. This rotational motion source typically has a controlled rotational speed and total accumulated rotational displacement in order to monitor and control accurately the linear speed and displacement of spanning nut 28 and the associated devices such as shower head 30 (FIG. 1) or instrument 64 (FIG. 3).

FIGS. 4, 5A and 5B illustrate an alternative embodiment of screw traversing mechanism 10. Lead screw segments 14, 16 include semi-cylindrical cavities 70, 72, respectively, coaxial with semi-cylindrical flanges 38, 40. Semi-cylindrical flanges 38, 40 of lead screw segments 14, 16 form male elements which mate into the corresponding females formed by semi-cylindrical cavities 70, 72, respectively of the adjacent lead screw segment (16, 14, respectively). The cavities 70, 72 constrain the segment ends to mate with the adjacent segment ends. The rigidity of the joint is thus provided by hoop stress of the cavity instead of tension in the center-of-joint screw or bolt 46, and therefore the resulting rigidity is far greater.

Thus the several aforementioned objects and advantages are most effectively attained. Although preferred embodiments of the invention have been disclosed and described in detail herein, it should be understood that this invention is in no sense limited thereby and its scope is to be determined by that of the appended claims.

What is claimed is:

1. A linear traversing apparatus comprising:

a lead screw along a longitudinal axis of rotation, at least a portion of said lead screw being threaded;

said lead screw is formed of a plurality of externally threaded lead screw segments;

axial ends of said externally threaded lead screw segments include flanges which are coupled to flanges of axially adjacent externally threaded lead screw segments by means preventing axial movement therebetween;

an axial length of said flanges is chosen to maintain continuous thread pitch between adjacent lead screw segments;

said flanges being semi-cylindrical with a substantially planar face along which said longitudinal axis of rotation of said lead screw passes;

respective said planar faces of said adjacent lead screw segments being placed against each other and being rotationally maintained by a plurality of fixed support devices engaging said lead screw along a span of said lead screw, respective said planar faces allowing at least one of said lead screw segment to be separately inserted into or removed from a corresponding support device free of requiring insertion or removal of an adjacent lead screw segment from said corresponding support device;

said support devices including hollow cylindrical portions in which said flanges are inserted for rotationally maintaining respective planar faces of adjacent screw segments therein so as to provide for rigidity and a substantially tight engagement therebetween which provides for a torsional force to be conveyed between adjacent lead screw segments and;

a spanning nut with threads engaging a portion of a circumference of said lead screw, said portion of the circumference being sized to allow said spanning nut to axially traverse said threaded lead screw free of obstruction by said support devices in response to rotation of said lead screw in combination with inhibition of rotation of said spanning nut.

2. The linear traversing apparatus of claim 1 wherein said plurality of support devices engage said lead screw along portions of said lead screw which are free of threading.

3. The linear traversing apparatus of claim 2 wherein said hollow cylindrical portions engage said lead screw along said portions of said lead screw which are free of threading.

4. The linear traversing apparatus of claim 3 wherein said coupling means further includes respective radially oriented apertures in said flanges which are aligned and a bolt fastening said flanges of adjacent lead screw segments together and thereby creating said portions of said lead screw which are free of threading.

5. The linear traversing apparatus of claim 4 further including means for inhibiting rotation of said spanning nut.

6. The linear traversing apparatus of claim 4 wherein said coupling means further includes an aperture in said hollow cylindrical portion of said support device permitting said bolt to pass therethrough.

* * * * *